United States Patent
Syvänne

(10) Patent No.: US 7,360,242 B2
(45) Date of Patent: Apr. 15, 2008

(54) PERSONAL FIREWALL WITH LOCATION DETECTION

(75) Inventor: Tuomo Syvänne, Vantaa (FI)

(73) Assignee: Stonesoft Corporation (FI)

( * ) Notice: Subject to any disclaimer, the term of this patent is extended or adjusted under 35 U.S.C. 154(b) by 1143 days.

(21) Appl. No.: 09/988,355

(22) Filed: Nov. 19, 2001

(65) Prior Publication Data

US 2003/0097589 A1    May 22, 2003

(51) Int. Cl.
G06F 11/30    (2006.01)
G06F 9/00     (2006.01)

(52) U.S. Cl. .............................. 726/11; 726/12; 713/187
(58) Field of Classification Search .................. 726/11; 713/187

See application file for complete search history.

(56) References Cited

U.S. PATENT DOCUMENTS

| 6,158,008 A | 12/2000 | Maria et al. | |
| 2003/0005089 A1* | 1/2003 | Kumar | 709/220 |
| 2003/0055962 A1* | 3/2003 | Freund et al. | 709/225 |
| 2003/0167405 A1* | 9/2003 | Freund et al. | 713/201 |

FOREIGN PATENT DOCUMENTS

| EP | 0 854 621 | 7/1998 |
| EP | 952 715 | 10/1999 |

* cited by examiner

*Primary Examiner*—Kambiz Zand
*Assistant Examiner*—Christopher J Brown
(74) *Attorney, Agent, or Firm*—Barnes & Thornburg LLP

(57) ABSTRACT

A computer device which can be connected to a home network and to a foreign network is provided with a local security mechanism, called a personal firewall, for protecting the computer device from attacks from the foreign network, in addition to or instead of a firewall in the internal network which protects the computer when connected to the internal network. The personal firewall is arranged to detect its current location, i.e. to determine the network to which it is connected at each particular moment, and to control its operation accordingly. The current location of the computer device is first determined on the basis of a currently used IP address of the computer device. Then this location determined on the basis of the current IP address of the computer device is verified by carrying out an additional location verification procedure with a predetermined network element.

10 Claims, 2 Drawing Sheets

PERSONAL FIREWALL WITH LOCATION DETECTION

FIELD OF THE INVENTION

The present invention relates to network security and, more particularly, to personal firewalls.

BACKGROUND OF THE INVENTION

Traditionally, a firewall is considered as a set of components forming a gateway between two or more networks. Thus, a firewall has been a gateway which operates at the same time as a connector and a separator between the networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), or any other device that can be used for such purposes. Although firewalls are mostly used to connect Local Area Networks (LANs), i.e. internal networks, to the Internet and to protect against attackers or undesired traffic in general, they may also be used to separate and connect different segments of internal network for security purposes. The advantages of having a firewall are numerous. A firewall secures the network and can be used as a tool for monitoring the traffic especially from the outside to the inside of the network guarded by a firewall. Because all traffic intended for the internal network must pass through the firewall, most of the network security actions and policies can be concentrated in this particular point. This is of course a cost and administrative advantage.

Nowadays, laptop computers and other portable computer devices are widely used. While outside the internal network, the laptop cannot make benefit of the protection provided by the conventional "gateway-type" firewall. Therefore, approaches to improve security of a client located in a foreign network (a public network or an internal network of a foreign organisation) have been proposed. These approaches are based on protecting the laptop itself by means of a local security mechanism, called a personal firewall herein, installed in the laptop (in addition to or instead of a firewall in an internal network, which protects the computers connected to the internal network). The personal firewall may be implemented as software installed in the computer device, or as a separate electronic device connected to the computer device.

European patent application EP 0 952 715 discloses a firewall security device connected to an external communication port of a computer device. The incoming communications stream to the computer device from e.g. public networks is passed through the firewall security device. The firewall device applies standard security measures, thereby protecting the computer device.

It is preferable that the laptop is automatically provided with a sufficient level of protection as soon as it is connected to a foreign network. Manual operation is not sufficient, since the laptops are often used by non-technical people, which increases the risk of overlooking security aspects. Laptops contain sensitive material, such as customer emails. If a laptop is unprotected, when connected to a foreign network, even for a short period of time, there is a risk of getting infected by hostile application. Such application can activate later, when the laptop is connected to internal network and offer inside help for attacks. On the other hand, when the laptop is connected to a company internal network, such personal firewall may unduly prevent some essential traffic. For example, the personal firewall should allow use of a laptop at a home (internal) network and access to all services, such as diskshare. In a home network even non-IP protocols are sometimes used. Therefore, it is not feasible to have a personal firewall running at all times, at least not with the same configuration, since the protection needs in an internal network are different from those in a foreign network.

Thus, there is a need for a location dependent control of a personal firewall. There are also other functions, such as a central management of a personal firewall, which could make benefit of knowing the location of the firewall with a sufficient degree of certainty.

One way to determine current location of the computer device is based on a currently used IP address of the computer device. This is based on the common practice that a computer device has a different IP address, either a fixed address or a dynamic address, in different networks. The IP address can thereby be utilised for identifying the current network and the location of the computer device. However, there are situations where the location determined on the basis of the current IP address is uncertain, i.e. the IP address fails to indicate the current location of the laptop. If the IP address does not match the current network, use of the Internet protocol (IP) to attack against the laptop is not likely, and one may reason that in that case a personal firewall does not need to be used. However, there is still a possibility that there is an attack using other protocols, such as NetBEUI or IPX. By detecting a situation where the IP address of the laptop is not an IP address of the current network, it is possible to block such protocols while in foreign networks. Further, NAT (network address translation) and private IP addresses are frequently used. This means that the same IP address can be in use in several networks. In that case it is not enough to trust IP address information only when determining the location of the network. It is even possible that while being connected to a hostile network, the DHCP (dynamic host configuration protocol) gives familiar IP address to make it easier to attack the laptop. Basically, the DHCP enables individual computers on a network to connect to a DHCP server and be assigned a dynamic IP address of the current network.

SUMMARY OF THE INVENTION

An object of the invention is a method for determining a location of a personal firewall.

A computer device which can be connected to a home network (such as an internal network of a company or other organisation where the user is employed) and to a foreign network (such as a public network or an internal network of a foreign organisation) is provided with a local security mechanism, called a personal firewall herein, for protecting the computer device from attacks from a foreign network, in addition to or instead of a firewall in the internal network which protects the computer when connected to the internal network. The personal firewall is arranged to detect its current location, i.e. to determine the network to which it is connected at each particular moment, and to control its operation accordingly. The current location of the computer device is first determined on the basis of a currently used IP address of the computer device. Then this location determined on the basis of the current IP address of the computer device is verified by carrying out an additional location verification procedure with a predetermined network element.

In an embodiment of the invention, availability of said predetermined network element related to the current IP address is checked. The predetermined network element is such that it responds only if the computer device is located in the network in which it is assumed to be on the basis of the current IP address. If the predetermined network element responds and identifies itself properly, the current location determined based on the current IP address is considered to be verified. Otherwise it is determined that the current IP address fails to indicate current location of the computer device. The additional verification process even makes it possible to automatically create a secured tunnel, such as a VPN tunnel to a home network even if the computer device uses the same IP address in the current location as in the internal (home) network.

In an embodiment of the invention, the location information is used for selecting active security rules for a personal firewall according to its current position.

In a further embodiment of the invention, the location information is used for location-dependent updating of security rules from a central management unit.

In a further embodiment of the invention, the location information is used for location-dependent handling of log files in a personal firewall.

BRIEF DESCRIPTION OF THE DRAWINGS

Preferred embodiments of the invention will now be described with reference to the attached drawings, in which.

PREFERRED EMBODIMENTS OF THE INVENTION

The present invention can be applied in personal firewalls in any computer device which can be moved between and connected to different networks. Typically such devices are portable computer devices, such as laptop computers, PDAs, communicators, smart phones, intelligent telecommunication devices, etc. In the following illustrative embodiments of the invention, a laptop computer is used as an example of suitable computer devices.

Figure 1:
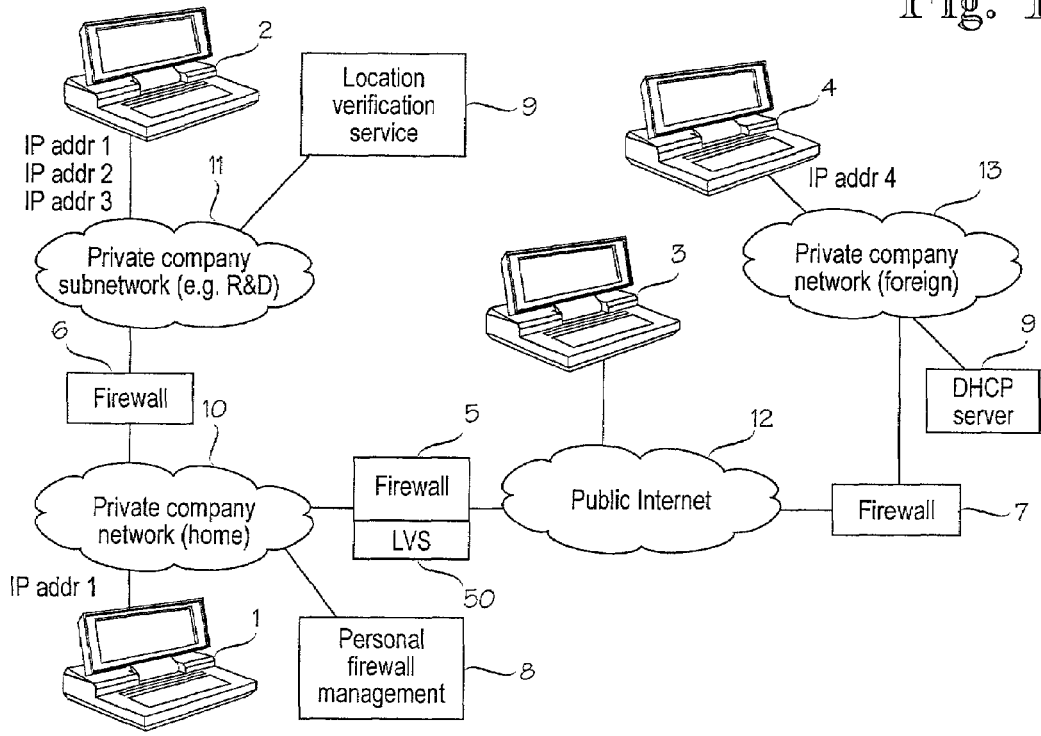
FIG. 1 is a schematic block diagram of an exemplary network configuration where the present invention can be applied.

FIG. 1 shows a schematic block diagram of an exemplary network configuration. The configuration is shown only to facilitate the understanding and description of the present invention. The present invention is not intended to be restricted to any particular network configuration. Further, in order to improve clarity, only network elements which are somehow involved with the present invention are shown in FIG. 1.

As illustrated in FIG. 1, private local networks 10 and 13 are coupled to a public network, such as the Internet 12 via firewalls 5 and 7, respectively. Naturally, the coupling between the private networks and the public Internet 12 may include also routers and Internet service providers (ISPs not shown in FIG. 1). As is well known in the art, private networks 10 and 13 may be, for example, company networks, such as local area networks (LANs) which connect users and resources, such as workstations, servers, printers and the like of the company. A private internal network may also consist of several sub-networks separated by internal firewalls. In the exemplary network configuration shown in FIG. 1, the private company sub-network 11 is connected via a firewall 6 to the private local network 10. Such a sub-network 11 may be, for example, a dedicated network for a specific department of the organisation, such as the research and development (R&D) department which must have a restrictive access and higher protection level compared with other parts of the company network. Sub-networks of the company, such as the local networks of organisation headquarters and branch offices may be interconnected by secure connections, such as virtual private network (VPN).

As already described above, the firewalls 5, 6 and 7 are gateways which operate at the same time as connectors and separators between the networks in a sense that the firewall keeps track of the traffic that passes through it from one network to another and restricts connections and packets that are defined as unwanted by the administrator of the system. Physically a firewall is a machine with appropriate software to do the task assigned to it. It can be a router, a personal computer (PC), or any device that can be used for such purposes. However, the firewalls between the networks, or the implementations thereof, are not relevant to the present invention.

The present invention relates to protecting of a computer device, e.g. a laptop itself by means of a local security mechanism, called a personal firewall herein, installed in the laptop in addition to or instead of a firewall in a private network. The personal firewall may be implemented as software installed and run in the computer device, which is the preferred embodiment, or as a separate electronic device connected to the computer device. In FIG. 1, the laptops 1, 2, 3 and 4 illustrate laptops provided with a personal firewall.

Figure 2:
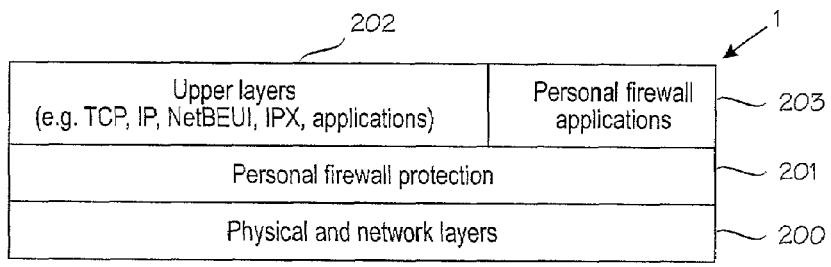
FIG. 2 shows an exemplary protocol stack of a computer device containing a personal firewall according to the present invention.

FIG. 2 illustrates the basic principle of the personal firewall installed in a laptop. Physical and network layers 200 refer to all protocols and physical connections required for transferring protocol data units (PDUs) of the upper layers. The upper layers 200 include applications and any transmission protocols employed, such as the Internet protocol (IP) transmission control protocol (TCP), NetBEUI, IPX, etc. Basically the personal firewall protection layer 201 operates in a manner analogue to a firewall between networks. More particularly, the personal firewall protection layer 201 operates at the same time as a connector and a separator between the underlying layers and the upper layer in a sense that the personal firewall keeps track of the traffic that passes through it from underlying layers to the upper layers, and vice versa, and restricts connections and packets that are defined as unwanted according to the security rules used. The personal firewall protection layer 201 is implemented or controlled by a personal firewall application 203 run in the laptop. In the preferred embodiment of the invention, the personal firewall application 203 carries out the location detection and the location-dependent functions described below, such as the selection of the active rule base according to the current location of the laptop. However, it should be appreciated that the present invention is not intended to be restricted to any specific practical implementation of the personal firewall.

The personal firewall according to the invention is arranged to detect its current location, i.e. to determine the network to which it is connected at each particular moment, and to control its operation accordingly. The simplest way to determine the current location of the laptop is to do it on the basis of the currently used IP address. As is well known in the art, a part of the IP address identifies the network, and can thus be used for detecting the current network of the laptop. The personal firewall may also, for example, contain information on the IP address space of home network, and optionally, foreign networks, or a list of addresses available for the laptop in the home network. When the current IP address of the laptop matches to a given address space or list of addresses of the home network 10, for example, it can be assumed that the laptop is located in the home network 10 and the rule base of the home network 10 is used. Thus, the current IP address is used as a selection rule for activating a rule base.

The current location (the current network) of the computer device is first determined on the basis of a currently used IP address of the laptop. Then this location determined on the basis of the current IP address of the computer device is verified by carrying out an additional location verification procedure with a predetermined network element.

In an embodiment of the invention, availability of said predetermined network element related to the current IP address is checked. The predetermined network element is such that it responds only if the computer device is located in the network in which it is assumed to be on the basis of the current IP address. If the predetermined network element responds and identifies itself properly, the current location determined based on the current IP address is considered to be verified. Otherwise the computer device determines that the current IP address fails to indicate the current location of the computer device. The additional verification process even makes it possible to automatically create a secured tunnel, such as a VPN tunnel to a home network even if the computer device uses the same IP address in the current location as in the internal (home) network.

As noted above, there are situations where the location (the current network) determined on the basis of the current IP address is uncertain, i.e. the IP address fails to indicate the current location of the laptop. Thus, according to the invention, in addition to the detection of location based on the current IP address described above, a further location verification procedure is carried out with a predetermined network element, which is preferably reachable only from the location to be verified. More generally, the network element is selected in such a way that it responses to the verification request only if the request originates from the location (i.e. the network) to be verified. Preferably, the specific network element is provided with a location verification service supporting the verification according to the invention. The verification procedure requires that the verification method be specified for the personal firewall, preferably at the same time as the different locations are specified. In other words, the methods to verify the location are specified for the personal firewall in the initial configuration, for example. It is also possible that the verification methods are updated or changed by means of the updating procedure described below, in a manner similar to other security rules.

Figure 4:
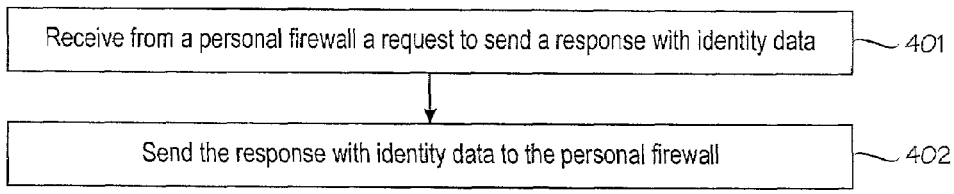
FIGS. 3 and 4 are flow diagrams illustrating the location verification procedure according to an embodiment of the invention.
Figure 3:
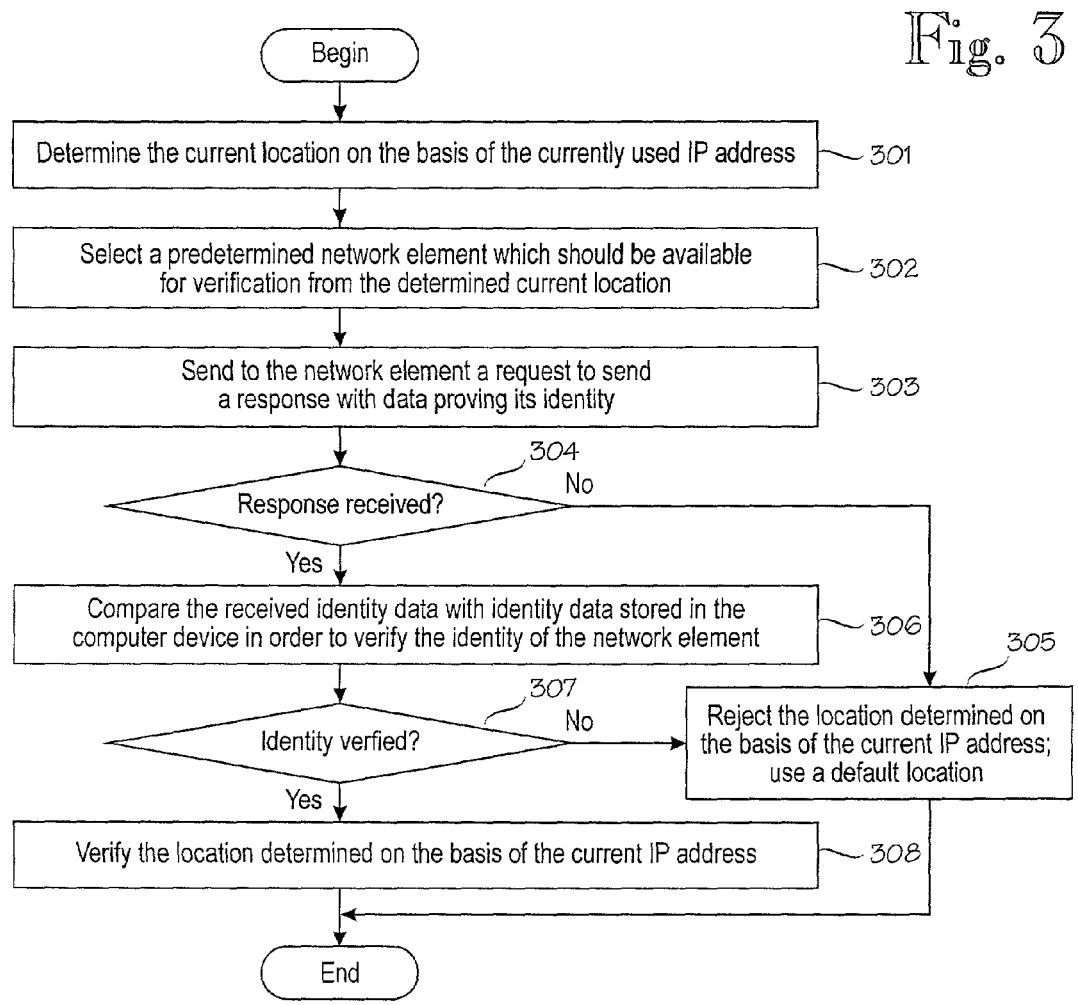

A generic location verification procedure according to one embodiment of the invention is described with reference to FIGS. 3 and 4. Firstly, the current location (the current network) is determined on the basis of the currently used IP address as described above (step 301). Next, the personal firewall selects a predetermined network element which should be available for verification from the determined current location (step 302). Then the personal firewall sends to the selected network element a request to send a response with some data proving the identity of the network element (step 303). Referring now to FIG. 4, the verifying network element receives the verification request from a personal firewall (step 401). Then, either always in response to the verification request or if predetermined requirements are met, the network element sends the response with the required identity data to the personal firewall (step 402). Referring again to FIG. 5, the personal firewall waits for a response (step 304), and if no response is received (preferably within a predetermined period of time) the location determined on the basis of the current IP address is rejected, and the location is determined to be unknown (step 305). In that case, a default location can be used. The default location is typically a hostile environment wherein high protection level is needed, such as the public Internet.

However, if the response is received from the network element in the step 504, the personal firewall verifies the identity of the network element on the basis of the received identity data, e.g. by comparing the received identity data with identity data stored in the personal firewall (step 306). If the verification of the identity is unsuccessful (step 307), the procedure proceeds to the step 305 described above. However, if the verification of the identity of the network element is successful, also the location of the laptop determined on the basis of the current IP address has been successfully verified and can be accepted.

Additionally, it is possible that one IP address is included in more than one selection rule in the personal firewall. In that case, if the verification of the laptop being located in a first network indicated by the current IP address fails, it is checked if the laptop is located in a second network indicated by the current IP address.

There are various ways to implement the generic location verification procedure described above. The simplest way to implement the location verification service is to probe some known (known to the personal firewall) element. For example, it is possible to ask the MAC address of the known network element located in the home network and having a known IP address. The network element returns the MAC address in the response, and if the AMC address is the one that it is assumed to be (e.g. matches with the MAC address stored in the personal firewall), it is verified that the laptop is located in the home network. If the MAC address is not correct, the laptop is determined to be outside the internal network.

One possible implementation is that the location verification service is implemented in such a network element in an internal network which can be reached only from inside the internal network. For example, the firewall protecting the internal network, such as firewall 5 in FIG. 1, may be configured to discard all connections from outside the internal network to this network element. If the personal firewall is able to reach this specific network element, it is verified that the personal firewall resides inside the internal network. Otherwise the personal firewall resides outside the internal network. There may be a plurality of such location verification services in a plurality of internal networks or sub-networks, and if the personal firewall cannot reach any of them, it is assumed to be outside this plurality of internal networks or sub-networks.

The location verification service may be incorporated into the network firewall, such as the location verification service 50 in the firewall 5 in FIG. 1. For example, verification requests only from the direction of the internal network (such as home network 10) may be responded by the location verification service 50. This implementation is rather straightforward, since the present firewalls are readily capable of detecting from which direction, that is, from which interface, a data packet is coming from.

In any case it is preferred that the personal firewall communicates with the location verification service by using some cryptographically strong method, such as public key encryption. For example SSL can be used. The certainty of the location verification can be further improved by setting the TTL (time-to-live) field in the location verification request to a relatively low value, so that the request is capable of reaching only a nearby location verification service. The TTL value is decremented each time the verification request passes through a router connecting different networks or network segments. If the TTL value is set to, for example, a zero value, the verification request is not able to pass through a router to a different network or a network segment.

The use of additional location verification makes it even possible to automatically create a VPN tunnel to the home network even if the current location (a foreign network) is using the same IP address as in the internal network.

In an embodiment of the invention, a personal firewall has different sets of rules for the home network (such as the private company network 10) and the foreign network, such as the public Internet 12, or the foreign private network 13, or a network of other department of the company. It is also possible that all protocols and connections are allowed in the home network. The personal firewall uses the inventive method to determine and verify the current location and automatically selects and activates the proper set of rules according to the current location of the laptop.

All the embodiments described above are effective both in standalone computers and in centrally managed computers. The central management of personal firewalls enables a uniform protection level in all computer devices using the private network. One feature of the central management is that preferably all of the personal firewalls have essentially similar security rules. It should also be possible to update these. It is preferable that rule updates are applied in the personal firewalls as soon as possible after they have been made in the central management. Because it is not sufficient to rely on the manual updating by the user, the process of updating the rules must be automated. However, distribution of the updated rules by a push transmission from the central management is not a sufficient option in a case where the personal firewalls can move from one network to another. Therefore, according to an aspect of the invention, the personal firewalls are arranged to periodically query the availability of updated rules from the central management. The query is made only when the laptop is connected to the home network. The location determination is based on the inventive methods described above.

It is also preferable that the logs relating to the communication transactions of the laptop are handled in a central location. Since the laptops are frequently disconnected from the home network, logs must be collected locally. In order to enable central handling, the logs must be transferred to a central log server, such as the personal firewall management 8, when such is available. This should take place automatically when the computer device provided with a personal firewall is connected to the home network. The personal firewall determines the current location of the laptop based on the inventive location determining methods described above. If the location of the laptop is in the home network, the personal firewall sends the log file to the central log server 8 immediately. However, if the current location of the laptop is not in the home network, the log file is stored locally. Similarly, a number of log files is collected locally while the laptop is disconnected from the home network. When the personal firewall next time detects that the computer device is relocated in the home network, it sends the collected log files to the central log server 8. Optionally, the personal firewall may also send the collected log files to the personal firewall management 8 when the laptop has established a (e.g. VPN) connection to the home network.

It will be apparent for those skilled in the art that the illustrative embodiments described are only examples and that various modifications can be made within the scope and spirit of the invention as defined in the appended claims.

The invention claimed is:

1. A method of detecting location for a personal firewall of a client computer, said method comprising
    determining the current location of said personal firewall based on an Internet Protocol (IP) address currently used by said client computer,
    verifying the current location determined on the basis of the current IP address of said client computer by carrying out a location verification procedure with a predetermined network element,
    sending log files to a centralized log server from said personal firewall when the current location of said client computer is in said home network, said log files containing information on communication transactions in said client computer,
    collecting log files locally at said personal firewall when the current location of said client computer is not in said home network,
    transferring said locally collected log files from said personal firewall to said centralized log server when said client computer is connected to said home network.

2. A method according to claim 1, wherein said step of determining comprises
    storing in said personal firewall a list of IP addresses of a home network,
    comparing the current IP address of said client computer with said list of IP addresses, and
    if the current IP address of said client computer matches one of said addresses on said list, determining said personal firewall to be located in said home network.

3. A method according to claim 1, wherein said step of determining comprises
    storing in said client computer an IP address space of a home network,
    comparing the current IP address of said client computer with said IP address space, and
    if the current IP address of said client computer matches said IP address space, determining said personal firewall to be located in said home network.

4. A method according to claim 1, 2 or 3, wherein said step of verifying comprises
    checking availability of said predetermined network element related to the current IP address, said predetermined network element responding only if said personal firewall is located in the network in which it is assumed to be on the basis of the current IP address,
    verifying the current location determined based on said current IP address if said predetermined network element responds with a specific identity data.

5. A method according to claim 4, wherein said specific identity data is a Media Access Control (MAC) address of said predetermined network element.

6. A method according to claim 4, wherein said predetermined network clement is a firewall in said home network.

7. A method according to claim 1, comprising
using said determined and verified location for selecting security rules for controlling said personal firewall in a location-dependent way.

8. A method according to claim 1, comprising
using said determined and verified location for enabling a periodical security rule update enquiry from said personal firewall to the central management, when said personal firewall is in said home network, and for disabling said periodical enquiry, when said personal firewall is outside said home network.

9. A computer terminal, comprising
a personal firewall having a mechanism monitoring the current location of said personal firewall based on a Internet Protocol (IP) address currently used by said computer terminal, said personal firewall having a mechanism verifying the current location determined on the basis of the current IP address of said client computer by carrying out a location verification procedure with a predetermined network element, said personal firewall having a mechanism sending log files to a centralized log server from said personal firewall when the current location of said client computer is in said home network, said log files containing information on communication transactions in said client computer, said personal firewall having a mechanism collecting log files locally at said personal firewall when the current location of said client computer is not in said home network, and said personal firewall having a mechanism transferring said locally collected log files from said personal firewall to said centralized log server when said client computer is connected to said home network.

10. A computer-readable medium, containing a computer software which, when executed in a computer device, causes the computer device to provide a personal firewall routine comprising determining the current location of said personal firewall based on an Internet Protocol (IP) address currently used by said client computer, verifying the current location determined on the basis of the current IP address of said client computer by carrying out a location verification procedure with a predetermined network element, sending log files to a centralized log server from said personal firewall when the current location of said client computer is in said home network, said log files containing information on communication transactions in said client computer, collecting log files locally at said personal firewall when the current location of said client computer is not in said home network, and transferring said locally collected log files from said personal firewall to said centralized log server when said client computer is connected to said home network.

* * * * *